United States Patent
Hall

(10) Patent No.: US 10,706,732 B1
(45) Date of Patent: Jul. 7, 2020

(54) ATTENTION VARIABILITY FEEDBACK BASED ON CHANGES IN INSTRUCTIONAL ATTRIBUTE VALUES

(71) Applicant: Nervanix, LLC, Naples, FL (US)

(72) Inventor: Adam Leonard Hall, Fort Myers, FL (US)

(73) Assignee: Nervanix, LLC, Naples, FL (US)

( * ) Notice: Subject to any disclaimer, the term of this patent is extended or adjusted under 35 U.S.C. 154(b) by 259 days.

(21) Appl. No.: 15/625,304

(22) Filed: Jun. 16, 2017

Related U.S. Application Data

(63) Continuation of application No. 14/193,715, filed on Feb. 28, 2014, now abandoned.

(60) Provisional application No. 61/770,712, filed on Feb. 28, 2013.

(51) Int. Cl.
  *G09B 5/00* (2006.01)
(52) U.S. Cl.
  CPC ........................ *G09B 5/00* (2013.01)
(58) Field of Classification Search
  CPC ........................................ G09B 5/00
  See application file for complete search history.

(56) References Cited

U.S. PATENT DOCUMENTS

| | | | |
|---|---|---|---|
| 4,203,452 A | 5/1980 | Cohen | |
| 5,339,826 A | 8/1994 | Schmidt et al. | |
| 5,724,987 A | 3/1998 | Gevins et al. | |
| 5,740,812 A | 4/1998 | Cowan | |
| 5,762,611 A | 6/1998 | Lewis et al. | |
| 6,053,739 A * | 4/2000 | Stewart | G09B 19/00 434/169 |
| 6,450,820 B1 * | 9/2002 | Palsson | G09B 19/22 434/236 |
| 6,457,975 B1 | 10/2002 | Miranda et al. | |
| 6,626,676 B2 | 9/2003 | Freer | |
| 2004/0230549 A1 * | 11/2004 | Freer | A61B 5/0482 706/61 |
| 2005/0197590 A1 * | 9/2005 | Osorio | A61B 5/048 600/544 |

(Continued)

FOREIGN PATENT DOCUMENTS

WO 93/21615 10/1993

OTHER PUBLICATIONS

Office Action dated Sep. 21, 2016 from corresponding U.S. Appl. No. 14/193,715.

(Continued)

*Primary Examiner* — Paul A D'Agostino
(74) *Attorney, Agent, or Firm* — Westman, Champlin & Koehler, P.A.; Theodore M. Magee

(57) ABSTRACT

A system includes a brain activity sensor sensing electrical activity of a students' brain and a device that receives messages from the brain activity sensor while the student is receiving instructions with a first value for an attribute of instruction and that determines a first attention level from the received messages. The device receives additional messages from the brain activity sensor while the student is receiving instructions with a second value for the attribute of instruction and determines a second attention level from the additional received messages. The device then determines an attention variability for the attribute of instruction based on a change in attention level from the first attention level to the second attention level.

21 Claims, 11 Drawing Sheets

(56) References Cited

U.S. PATENT DOCUMENTS

| | | | |
|---|---|---|---|
| 2007/0184420 A1* | 8/2007 | Mathan | G09B 19/00 434/236 |
| 2007/0225932 A1* | 9/2007 | Halford | A61B 5/0476 702/127 |
| 2007/0250133 A1* | 10/2007 | Carlson | A61B 5/02405 607/45 |
| 2008/0275358 A1* | 11/2008 | Freer | G09B 7/02 600/544 |
| 2009/0024448 A1 | 1/2009 | Pradeep et al. | |
| 2009/0069707 A1 | 3/2009 | Sandford | |
| 2009/0191513 A1* | 7/2009 | Wang | G09B 9/052 434/69 |
| 2010/0010289 A1* | 1/2010 | Clare | A61M 21/00 600/27 |
| 2010/0028841 A1 | 2/2010 | Eatough et al. | |
| 2011/0159467 A1 | 6/2011 | Peot et al. | |
| 2011/0183305 A1* | 7/2011 | Orbach | A61B 5/16 434/236 |
| 2011/0245629 A1* | 10/2011 | Giftakis | A61B 5/0476 600/301 |
| 2011/0245633 A1* | 10/2011 | Goldberg | A61B 5/681 600/301 |
| 2012/0029302 A1 | 2/2012 | Hsu et al. | |
| 2013/0113628 A1 | 5/2013 | Shepherd et al. | |
| 2013/0260361 A1 | 10/2013 | Mutlu et al. | |
| 2013/0291065 A1 | 10/2013 | Jakowski et al. | |
| 2014/0038147 A1* | 2/2014 | Morrow | A61B 5/0478 434/236 |
| 2014/0099623 A1* | 4/2014 | Amit | G09B 7/00 434/350 |
| 2014/0108842 A1 | 4/2014 | Frank et al. | |
| 2014/0178843 A1* | 6/2014 | Smyth | G09B 19/00 434/238 |
| 2014/0337244 A1 | 11/2014 | Lotvin et al. | |
| 2015/0213725 A1 | 7/2015 | Huntley et al. | |
| 2016/0004862 A1 | 1/2016 | Almehmadi et al. | |
| 2016/0027318 A1 | 1/2016 | Rao | |

OTHER PUBLICATIONS

Amendment dated Dec. 21, 2016 from corresponding U.S. Appl. No. 14/193,715.

Final Office Action dated Feb. 17, 2017 from corresponding U.S. Appl. No. 14/193,715.

* cited by examiner

ATTENTION VARIABILITY FEEDBACK BASED ON CHANGES IN INSTRUCTIONAL ATTRIBUTE VALUES

CROSS-REFERENCE TO RELATED APPLICATION

The present application is a continuation of and claims priority from U.S. patent application Ser. No. 14/193,715, filed on Feb. 28, 2014, the content of which is hereby incorporated by reference, which was based on and claimed the benefit of U.S. provisional patent application Ser. No. 61/770,712, filed Feb. 28, 2013, the content of which is hereby incorporated by reference in its entirety.

BACKGROUND

Recent developments in the fields of neuroscience and education technology have enabled the invention of Attention Adaptivity. Discoveries and trends from these fields have created conditions for innovation and demand for technologies that can gauge a student's level of attention and use these metrics to improve instruction.

Electroencephalography (EEG) devices that sense brain activity have been in use for decades, but the portability of modern EEG devices has made them much easier for people to wear and much less cumbersome in implementation. Specifically, it is now possible for dozens of students in a classroom to simultaneously wear wireless and relatively unobtrusive EEG sensors. It is also possible for each of these sensors to send information on brainwaves to Bluetooth® enabled devices. This capability is key because it allows for the collection of brainwave data in real time from a large number of people at once. Therefore, real time monitoring of brain activity from each student in a class is feasible.

Meanwhile, as online or computer-based instruction has become common in schools, academies, and universities, stakeholders have realized that technology affords teachers with the opportunity to personalize instruction. Personalization involves the delivery of content and activities that best address an individual student's needs, at least when each student has his or her own computer, tablet, or smart phone. The practice of assigning the right materials to students, historically, has been one of assessing a student's proficiency and then sending materials that are an appropriate challenge. This approach relies on a thorough understanding of the materials—difficulty level, grade level, associated academic standards—but the industry's understanding of the student is not as deep as our knowledge of content.

SUMMARY

A system includes a brain activity sensor sensing electrical activity of a students' brain and a device that receives messages from the brain activity sensor while the student is receiving instructions with a first value for an attribute of instruction and that determines a first attention level from the received messages. The device receives additional messages from the brain activity sensor while the student is receiving instructions with a second value for the attribute of instruction and determines a second attention level from the additional received messages. The device then determines an attention variability for the attribute of instruction based on a change in attention level from the first attention level to the second attention level.

In a further embodiment, a method involves receiving sensor data from a brain activity sensor that senses electrical activity of a student's brain during two different phases of instruction, where each phase of instruction has a different value for an instruction attribute, and using the sensor data to determine a variability of attention levels of the student in response to changes in the instruction attribute.

In a still further embodiment, a system includes a brain activity sensor sensing electrical activity of a student's brain and a device receiving messages from the brain activity sensors. The device uses the received messages to determine a variability of the student's attention level based on changes in an instructional attribute and generates a user interface displaying the variability in the student's attention level based on changes in the instructional attribute.

DETAILED DESCRIPTION OF ILLUSTRATIVE EMBODIMENTS

Figure 1:
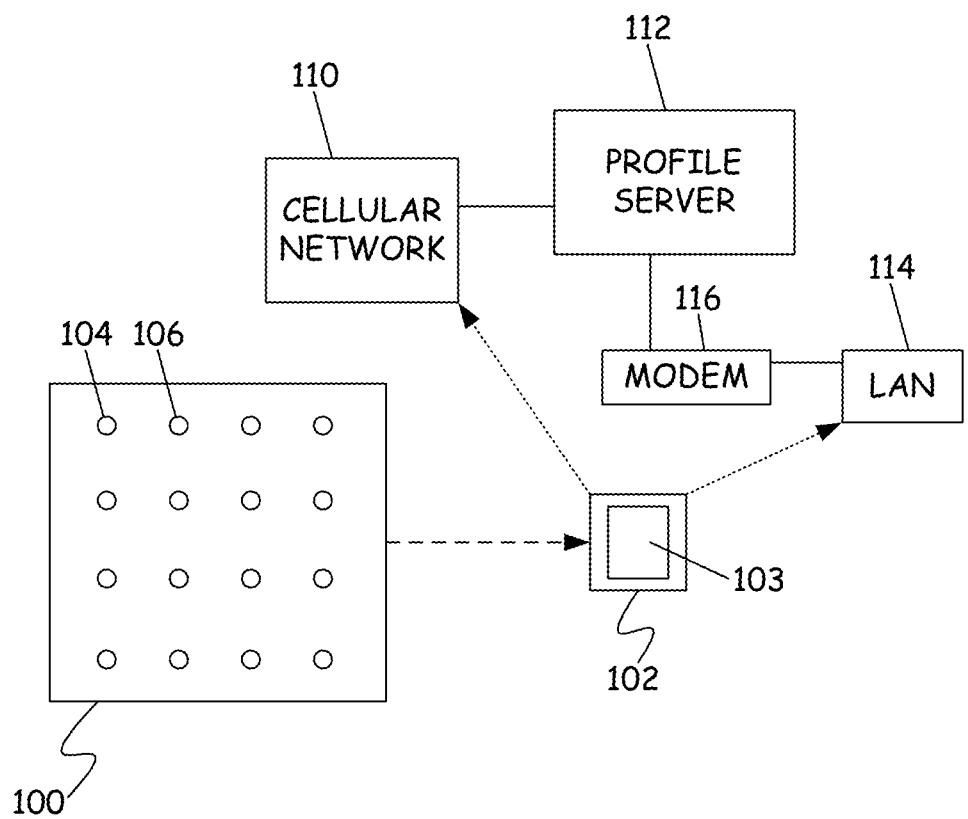
FIG. 1 illustrates exemplary embodiments of a handheld mobile device.

Attention Adaptivity, as an embodiment of an invention, is a process for converting raw brainwave data into attention scores and then applying these scores in software systems to improve instruction. These raw data are captured by an EEG device that tracks brainwave activity and sends data back to any Bluetooth® enabled device, where they are ingested and sent to a software system. Embodiments process attention data and associate them with a variety of data points—student histories, instructional approaches, time of day, academic subjects and standards—in order to improve instruction by optimizing attention levels of students.

Embodiments provide a metric that denotes the attention level of a student and the application of this metric to improve the efficacy of and engagement in instruction. In some embodiments, this "attention metric" is derived from a combination of EEG sensors worn by students and data on the learner's performance, environmental conditions, and instructional circumstances. Embodiments also include the distillation of EEG brainwave data in order to produce attention metrics on students and the applications of attention metrics in instructional settings. Embodiments further identify multiple applications of attention metrics, and many of them relate directly to the concept of adaptive instruction. Adaptivity refers to personalizing instruction to an individual student based on knowledge about that student. Some embodiments identify applications of the attention metric to attention coaching, or more qualitative feedback to teachers and students on the optimal content and circumstances for learning. Other embodiments address applications of the attention metric to the evaluation of educational products and content, such as software systems, textbooks, or collections of learning objects.

Following is a scenario in which attention scores are being captured and processed according to the several embodiments.

There are twenty students in a classroom, each wearing a headset. A Bluetooth® enabled device is active and within range of the headsets. This device receives data from the headsets and sends them to a software system. Attention Adaptivity begins its work here, associating these brainwave data with information about students, data on the environmental conditions of teaching and learning, and information about the educational product (i.e. any software system or instructional content) that the student is reviewing. Returning to the classroom, the teacher has a computing device that is registered with the school's site code so that now, when she looks at her dashboard on her device, she sees her twenty students represented with displays that are periodically updated to denote levels of attentiveness for each student.

The attention metric for each student is articulated as a score of one of five levels: poor attention (in accordance with some embodiments displayed to people with red shading or highlighting or as a numerical score of "1"), moderate to poor attention (orange or "2"), moderate attention (yellow or "3"), moderate to high attention (green or "4"), and high attention (blue or "5").

As the teacher conducts her lesson plan, she occasionally glances at her device to see who is paying strong attention and who is not; who is green/blue and who is orange/red. When she looks out at the faces in the class, Billy seems to be looking at her attentively but, in reality, he's daydreaming about what kind of fun activity he's going to do when school gets out. However, when the teacher glances at the dashboard on her device, she clearly sees that Billy is not paying attention, in the red zone, and she can modify her instructional approach accordingly to re-engage him. She can customize her approach to maximize learning outcomes for Billy.

A teacher's ability to customize lessons for students is supported by various embodiments, which provide a series of notifications and adaptations through various computing devices to teachers and students based on student attention levels and trends. All of these notifications and adaptations are based on decision rules that are linked to the five-band framework of attention levels. In accordance with some embodiments, while the system is capturing raw EEG brainwave data at a near-constant rate, attention levels scores are used and displayed to users at fixed intervals (every 15 seconds as a default with shorter or longer intervals possible). When attention level scores in consecutive intervals remain at a very high or low level, or when the scores change significantly, some embodiments of the system communicate in ways meant to increase student attention and, by extension, performance in learning.

The following table identifies decision rules for providing notifications and adaptations in accordance with some embodiments. These decision rules are executed by a processor, which also issues the notifications and/or adaptations through one or more user interfaces.

| Adaptive Action | Presented on . . . | Occurs when . . . | Description |
| --- | --- | --- | --- |
| Stop, contact teacher, or request to continue | Student Device | Two consecutive readings at the lowest attention level | The student session pauses and only continues after a teacher action. |
| Forced full screen or magnification | Student Device | A drop of two levels or a drop from Level 3 to Level 2 | Forced full screens or magnification are cues to focus without a pause. |
| Forced brightness change | Student Device | A drop of two levels or a drop from Level 3 to Level 2 | Students receive momentary changes in brightness levels as cues to pay better attention. |
| Dialog box: stop, continue, get help | Student Device | Two consecutive readings at low attention levels | Students are prompted to seek help when attention is low but not at the bottom level. |
| Positive reinforcement due to high attention scores | Student Device and Teacher Device | Two consecutive readings at Level 4 and/or 5. | Students and teachers receive a non-interruptive notification of high attention levels. |
| Stop, return to previous content, make contact | Teacher Device | Two consecutive readings at the lowest attention level | Teachers must choose to interact or continue a student session when attention levels are at their lowest. |
| Low group attention levels | Teacher Device | Two consecutive Level 1 and/ or Level 2 readings for 75% or more of a group of students | Teachers receive a notification that their students groups are not attending well. Consequent are actions up to the teacher. |
| High group attention levels | Teacher Device | Two consecutive Level 4 and/or Level 5 readings for 75% or more of a group of students | Teachers receive a notification that their students are attending well. Consequent actions are up to the teacher. |
| Student badge award | Teacher Device | Two consecutive readings at Level 5 for an individual student | Teacher receives notification that a student has earned an attention badge. Teacher can then choose to make the student aware of the badge during instruction or wait until the learning session is over. |
| Attention levels by teacher | Educational Administrator Device | A teacher's aggregate attention score (i.e. the average attention level scores for all of his or her students) differs from a school's average by more than ones tandard deviation. | Education program administrators (or supervisors of teachers) receive notifications and links to reports when a teacher's attention level scores are unusually low or high. Consequent actions are up to the administrators. |

Let's look at the same scenario described above, but this time, prior to beginning her lesson, the teacher opts to record this session and have the resulting data contribute to the students' ongoing profiles, which are based on long-term collection of data on an individual. Before she begins her lesson, she registers the session and identifies details about the conditions and context. Selection options may include but are not limited to:

| Session Attribute | Value of this Attribute |
|---|---|
| Time of Day/Week/Month/Year | Most students are more attentive during certain times of day. |
| Time length of session | Attention levels tend to vary over time and wane during longer sessions. |
| Instructional approach | Students may be more attentive when certain instructional methods (e.g. based on video/audio, individual/small group/class work) are being used. |
| Subject | Students often pay more attention to specific subjects, and teachers may recognize opportunities to blend instruction of subjects in order to help with attention levels with low-scoring subjects. |
| Personnel (i.e. teacher, teaching assistant, student mentor) | A student might have highly variable attention levels based on the person with whom he or she works. |
| Media Type (i.e. by file format to indicate video, audio, animation, or text or by meta data of an object that indicates the media type) | This attribute tends to have more value at a class or school level, generally helping teachers and administrators identify content that gains attention from students. Value to individual students relies on a large data set for that student. |
| Educational Product (i.e. software systems, applications, content collections, courseware, or textbook being used) | This attribute tends to have more value at a class or school level, generally helping teachers and administrators identify products that gain attention from students. Value to individual students relies on a large data set for that student. |
| Common Core Standards (i.e. the academic standards being addressed during the session) | Teachers can view how students not only perform in relation to standards but also how well they pay attention when these standards are addressed. Therefore, teachers may be able to distinguish between standards that are genuinely difficult for students from those that are not getting enough focused attention from students. Teachers and administrators can learn which standards require different means of instruction due to low attention scores with current means. |

Over time, for each student, embodiments will construct comprehensive profiles that give all stakeholders very powerful information about what makes these individual students "tick". Administrators, teachers and parents can use such data to take formative approaches to a student's learning. Over time, they will know what kinds of inputs need to be in place to maximize the learning process given any individual student. This value can extend to anyone working on a student's behalf. For example, in accordance with some embodiments, guidance counselors sit down with high school sophomores and juniors and use their attention-based Profiles to help steer them to the right higher education/training path. Colleges/Career Centers/Military use attention-based Profiles to help steer candidates and customize learning plans to help maximize their chances for success.

A powerful aspect of the embodiments lies in the ability to not only identify levels of attention in real time but to document those attention levels and associate them with various environmental influences during the instructional process. Longitudinal data, or information collected over time on an individual, is of great value to understanding students and analyzing the value of the instruction they receive. Over time, statistical analyses are applied to see which combinations of environmental inputs serve to maximize an individual student's attention levels, and ipso facto his chances to comprehend information.

Combinations of environmental inputs, information about the student's learning styles, and information about the instructional content impact these abilities to pay attention and comprehend. The invention will not rely on personally identifying information of students but rather what contributes to their processes of learning and how we may optimize them. Embodiments use these types of data to apply meaning to attention metrics, to recommend changes to a student's instruction that play to that learner's strengths or that challenge her to focus and grow when conditions are right.

Using examples of data types from the above table, embodiments form an understanding of students that include dimensions of time (time of day/week/month/year, time length of session, media type, and product), curriculum (subject, media type, educational product, Common Core standards), and instruction (instructional approach and personnel). When attention levels are low, some embodiments recommend new actions or instruction to which the student is more likely to pay attention. Going back to our original scenario of Billy, the student who is not paying attention, the teacher can see that Billy's attention scores are low, and she can also see recommendations on how Billy might be more inclined to focus. One possibility (one related to time) might be that Billy, when seeing new information for the first time, does a good job of paying attention during the first 20 minutes of a class period but tends to do poorly afterward. Another possibility (one related to curriculum) might be that Billy does not attend well when he is being presented with information, that Billy must interact directly with content (e.g. by pausing or replaying a video or by manipulating data to change a chart or graph) in order to engage. A third possibility (one related to instruction) might be that Billy does not attend well when the entire class is at work together. His attention scores tend to go up considerably in small groups, and, when in class, Billy's attention levels tend to go down sharply when students around him are talking. The invention integrates attention level data with these attributes of a student's profile in order to find intelligent, context-aware recommendations. These recommendations can come in the form of adapting experiences in a software system or notifying teachers and recommending actions.

This interplay among EEG-derived brainwave data, environmental conditions, characteristics of students, and attributes of the educational materials or content provides several advantages to the various embodiments and affect the value of the embodiments to all audiences. Generalizing broadly, these data types are used to support students and teachers during instruction with notifications and interventions, to help students and teachers before or after instructional events with information and attention coaching, and to help evaluate educational products or content, either for vendors that provide the products or for school administrators who must consider whether to renew or change the products they buy for their students. The data types that describe the environment, students, and educational products are used to apply the five-band attention levels scores as well as to help articulate and corroborate the five-band scores.

This document has previously reviewed the usage of environmental condition data in relation to attention scores. Generally, high and low attention levels by certain attributes (e.g. time of day, media type, time length of session) let students and teachers know where there are strengths and areas for improvement. This student profile, made up of attention scores and environmental conditions, is then used in tandem with two other types of data, student meta data from an external source like a school database and data that describe the educational product (i.e. instructional applications or content).

Products have attention profiles in ways that are similar to those of people. In tandem, profiles of each work together to match students with optimal products. Attention profiles of students are a series of measurements that indicate the conditions under which a student is most likely to pay attention. Attention profiles of products use the same kinds of measurements to identify the similar characteristics that might impact student attention levels. The measurements come from the same types of data that have been discussed earlier: environmental conditions, student attributes, product attributes, and attention level scores.

The following table describe the measurements that comprise the attention profile:

| Measurement | Value Range | Comment |
| --- | --- | --- |
| Persistence | 0 to 1 | This measurement is of sustaining attention levels over time within a single learning event. A "1" would mean that attention levels do not reduce from the early stages of an event to the end of that event. A "0" would mean that attention levels go down to the lowest measureable levels within a few minutes of the start of the event. |
| Extraversion | 0 to 1 | Social interactions (i.e. activity involving interactions with other people) and its impact on attention levels. A "1" indicates that the student only attends well during social interactions. A "0" indicates that a student never attends well. |
| Autonomy | 0 to 1 | Self-direction versus direction from other people or machines. A "1" indicates that the student only attends well when in control of the content he or she views. A "0" indicates that a student never attends well. |
| Video | 0 to 1 | A "1" indicates that the student only attends well when interacting with videos or images. A "0" indicates that a student never attends well. Could be combined with audio and text for a single "media richness" measurement. |
| Audio | 0 to 1 | A "1" indicates that the student only attends well when interacting with content that includes an audio track. A "0" indicates that a student never attends well. Could be combined with video and text for a single "media richness" measurement. |
| Text | 0 to 1 | A "1" indicates that the student only attends well when interacting with text only. A "0" indicates that a student never attends well. Could be combined with video and audio for a single "media richness" measurement. |
| Smart Phone | 0 to 1 | A "1" indicates that the student only attends well when interacting with a smart phone. A "0" indicates that a student never attends well. Could be combined into a single "device" measurement. |
| Tablet | 0 to 1 | A "1" indicates that the student only attends well when interacting with a tablet. A "0" indicates that a student never attends well. Could be combined into a single "device" measurement. |
| Computer | 0 to 1 | A "1" indicates that the student only attends well when interacting with a computer. A "0" indicates that a student never attends well. Could be combined into a single "device" measurement. |

Student data from external sources are generally available via the databases maintained by school systems, and they can be collected via an Application Programming Interface (API) or via integration with a school database. While observing all relevant data privacy practices that ensure compliance with the law and the wishes of client school organizations, the invention can use these school data on students in order to add additional depth to its understanding of student attention levels, student achievement in coursework, school programs or interventions in which the student participates, and disciplinary records. Each of these data types might indicate an impact on a student's attention levels that greatly impacts teaching and learning and, ultimately, the choices that teachers and students make about what, when, and how to study.

The preceding scenario described a teacher working with a group of students and viewing their attention scores in order to improve teacher insight and inform their approaches. The following scenario assumes that students are engaged in instruction with a web-enabled device, such as a computer, tablet, or smart phone. In this context of online learning, the embodiments of the invention apply attention scores to adapt the systems, screens, and/or content that students use.

A student is online, learning how to add fractions by viewing a series of videos that explain related concepts and taking a set of quizzes to regularly check the ability to work with fractions. The videos and quizzes are a part of the same software system, which operates adaptively, meaning that the system presents students with recommended videos or quizzes based on that student's prior actions. For example, if Billy takes a quiz that shows that he is good at recognizing denominators but poor at establishing a common denominator, the system will present him with videos and quiz questions to focus instruction on the specific skill that Billy lacks.

This adaptive approach, based on a student's responses to quiz questions and subsequent remediation of incorrect responses, is common in educational technology. The embodiments of the invention enable an additional dimension of inputs to adaptivity, one of attention levels. These inputs can be used to improve a system's understanding of students, both in terms of knowing a student's disposition towards learning at a given moment and over time. Also notice how the embodiments can use attention level measurements to better understand which lesson or content to use with the students. In this scenario, the video and quiz package matches Billy's profile in that the attributes of the product are a good match with Billy's attention profile: includes video, is interactive, asks frequent questions, and addresses a skill that Billy needs to learn in order to advance in his studies. If it is the case that Billy's attention levels and productivity are decreased as a result of this video and quiz product, the invention will prompt the teacher to coach the student, or some sort of direct intervention will occur, such as sending Billy to a different experience that should raise his attention levels to the desired level.

Picking up the plot of the current scenario, Billy has an issue with understanding how to establish a common denominator. Now, the embodiment of the invention has been integrated with the online learning environment, adding student attention scores to the system's adaptive approach. The system observes that Billy is not correctly answering questions about common denominators, but it also observes that Billy is often correctly answering questions that are supposed to be more difficult, questions that address the actual adding of fractions. Billy is doing well with the basic skill of recognizing denominators in a fraction, and he is doing adequately at adding fractions when the denominators are the same or when the denominators are easy to make common (e.g. adding ½ to ¼), but he is not doing well at the intermediate skill of establishing a common denominator in general.

Nevertheless, attention scores are very low when Billy views videos that review establishing common denominators. His attention scores are moderate or better for the other videos. Something about the common denominator videos is not working for Billy. Based on this observation, the system uses the attention scores from the embodiment to change the materials recommended to Billy. Instead of the normally assigned videos, the system may direct Billy to a text-based passage of content or more examples of solved common denominator problems. The embodiment of the invention can also be used to prompt Billy's teacher about his struggles, allowing her to help in some way.

The embodiments of the invention also enable the system to adapt student experiences among software systems, not only within a single system as described in the preceding paragraphs. If Billy's attention scores are low on common denominator videos, the embodiment can help recommend instruction from another software system in order to provide alternate content. In still another scenario, the embodiment can conclude that Billy's attention scores are low for any type of instruction, and the software system can disengage Billy from his learning session, send him to an online activity that is much more likely to increase his attention span (e.g. an online game), and then wait for his attention scores to raise before returning him to his instruction on adding fractions.

In a final scenario, value to teachers, administrators, and the providers of educational products is realized. Here, the embodiments of the invention are used to evaluate educational products and content in terms of how they gain and keep the attention of students.

A school administrator is viewing the reports on students that include attention metrics, and the administrator notices that the collection of videos used to help teach fractions has low attention levels from students. A further review indicates that about 20 of the 50 videos in this collection have particularly low attention scores. The administrator then sees that the 20 videos have one important thing in common: length. The average length of the 20 poorly attended videos is over 5 minutes, and the average length of the other 30 videos is under 2 minutes. The administrator supposes that overly long videos are not working well with students.

With this information, the school administrator has some options for improving instruction. One improvement would be to contact the provider of the videos and ask them to edit these 20 videos and, if necessary, produce a larger number of shorter videos. A second approach would be to discuss teaching strategies with teachers, to ask teachers to coach or support students as they work with longer video lessons. A third approach would be to discontinue the subscription to the video collection and to replace it with a product that can gain more attention from students. The embodiments of the invention will not diagnose the cause of poorly attended content or poorly attending students, but they will identify poor attention levels and associate them with content, students, or conditions that can be assessed.

In one embodiment of the invention, technologies that capture the eye movements of students are implemented. These technologies involve the use of a special camera that is mounted on the student's computer and pointed at the student's face. Eye movement technologies allow software systems to know the specific locations where people are directing their vision, including specific elements on a computer screen. The eye movement camera delivers data on screen locations that are later associated with specific elements on a screen that students see. These screen elements are then associated with attention levels based on timestamp data for both the capture of attention level data and the capture of eye movement data. As a result of these implementations, teachers and school administrators will have information not only on the software systems, eBooks, or lessons that engage students but the specific images, passages of text, or other specific elements of these products that are of particular value to students, including notes or other content generated by students themselves. Administrators will better understand which technologies to acquire for their students because they will know specifically what engages their students. Content providers will have better insights on how to revise and present their products in relation to student attention levels. Teachers and students will have more specific information on the types of content that students are most inclined to use productively.

FIG. 1 is a block diagram of elements used in accordance with one embodiment. In FIG. 1, a collection 100 of brainwave sensors such as brainwave sensors 104 and 106 are in communication with a client device 102 that includes a display 103. The brainwave sensing devices 104 and 106 are able to sense electrical signals generated by the brain of a person. In accordance with some embodiments, a separate brainwave sensor, such as brainwave sensor 104 or brainwave sensor 106, is provided for each student in a classroom. Each brainwave sensor is able to provide a signal indicative of an attribute or a status of a person's brain such as the current attentiveness of a person.

The individual signals provided by the brainwave sensors are provided to client device 102, which includes a processor and one or more memory units. The signals may be sent using any acceptable communication standard such as 802.11x (Wi-Fi) protocols, and Bluetooth® protocol, for example. The processor within client device 102 is able to use the signals from the brainwave sensors to generate a user interface on display 103 that indicates the status or attribute of one or more people associated with the collection of brainwave sensors 100. In accordance with one embodiment, the user interface displays a level of attentiveness for each student in a classroom. Client device 102 is also capable of recording the status or attribute of each person over a period of time and to mark the status or attribute with time markers so that the status or attribute can be associated with activities that were taking place in the room or personnel who were present in the room. For example, the status or attribute of the user's brains can be associated with a type of instruction being provided, the personnel providing the instruction, the subject matter of the instruction and the like.

In other embodiments, the brainwave sensors communicate to client device 102 through one or more intermediary devices. Such intermediary devices may pass on only selected information from the brainwave sensors to client device 102 and may store the information that is not passed to client device 102 for later analysis. Thus, the intermediary devices may act as storage buffers when client device 102 is unable to receive all of the information that the brainwave sensors produce. In particular, if the number of brainwave sensors or the bandwidth of the data produced by the collection of brainwave sensors is more than client device 102 can accommodate in real time, the intermediary devices can accept and store the additional information and provide the data to client device 102 later.

The status or attribute information is provided by client device 102 to a profile server 112. This information can be provided through a cellular network 110 or may be provided through a local area network 114 that communicates with profile server 112 through a modem 116. Profile server 112 maintains a profile for each user of the brainwave sensors where the profile provides a history of brain status and attributes for each user. This profile information can be used to identify optimal teaching modes for each student including optimal instruction material, optimal teaching personnel, optimal times of day for learning, students requiring additional instruction, and students requiring more challenging material to further engage the student.

Figure 2:
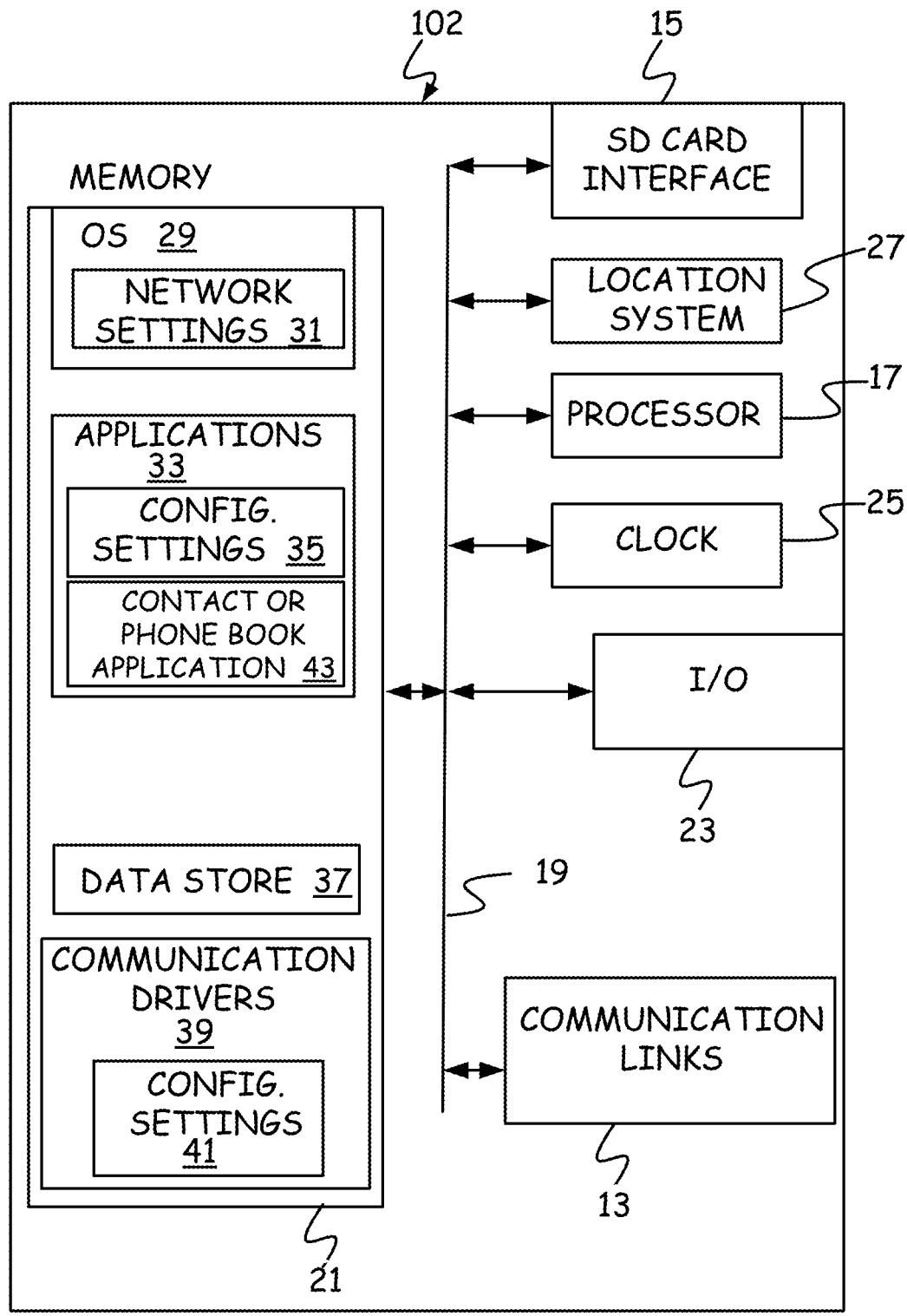
FIG. 2 is a block diagram of a mobile device that may be used in accordance with various embodiments.

FIG. 2 provides a general block diagram of the components of one example of client device 102 in which client device is a mobile device such as a phone, personal digital assistant, tablet computer or laptop computer, for example. In client device 102, communications links 13 allow the device to communicate with the brainwave sensors and other computing devices. Examples of communications links 13 include an infrared port, a serial/USB port, a cable network port such as an Ethernet port, and a wireless network port allowing communication though one or more communication protocols including General Packet Radio Service (GPRS), 1Xrtt, and Short Message Service, which are wireless services used to provide cellular access to a network, as well as 802.11 and 802.11b (Wi-Fi) protocols, and Bluetooth® protocol, which provide local wireless connections to networks and devices such as the brainwave sensors.

In device 102, applications or systems can be received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 102 can include input components such as buttons, touch sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 102. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 102 or applications that are installed during use, although these can be part of operating system 29, or hosted external to device 102, as well.

Figure 3:
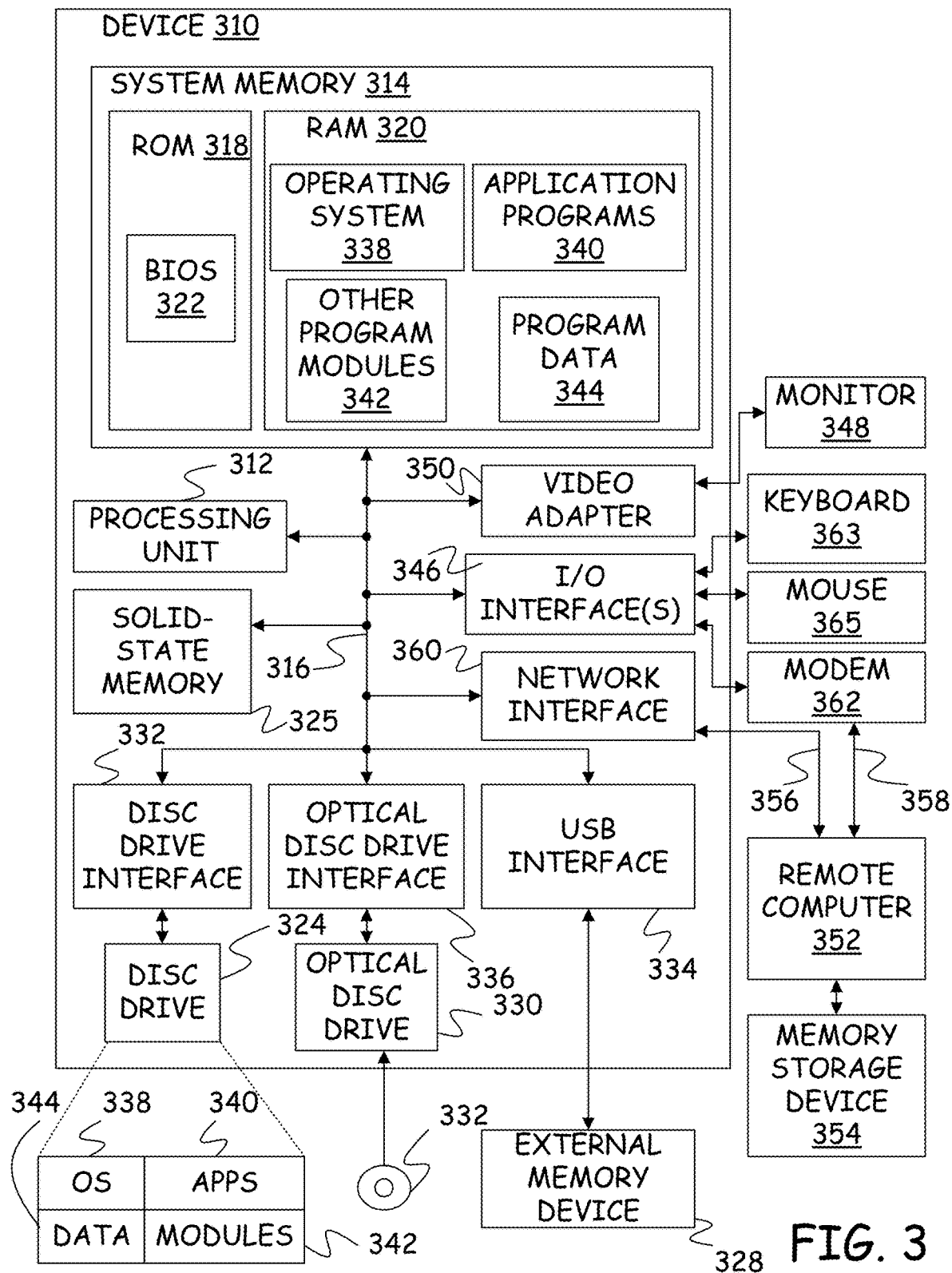
FIG. 3 is a block diagram of a computing device that may be used in accordance with various embodiments.

An example of a computing device that can be used as a server and/or client device and/or intermediary device in the various embodiments is shown in the block diagram of FIG. 3. The computing device 310 of FIG. 3 includes a processing unit 312, a system memory 314 and a system bus 316 that couples the system memory 314 to the processing unit 312. System memory 314 includes read only memory (ROM) 318 and random access memory (RAM) 320. A basic input/output system 322 (BIOS), containing the basic routines that help to transfer information between elements within the computing device 310, is stored in ROM 318. Computer-executable instructions that are to be executed by processing unit 312 may be stored in random access memory 320 before being executed.

Embodiments of the present invention can be applied in the context of computer systems other than computing device 310. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 310 further includes a hard disc drive 324, an external memory device 328, and an optical disc drive 330. External memory device 328 can include an external disc drive or solid state memory that may be attached to computing device 310 through an interface such as Universal Serial Bus interface 334, which is connected to system bus 316. Optical disc drive 330 can illustratively be utilized for reading data from (or writing data to) optical media, such as a CD-ROM disc 332. Hard disc drive 324 and optical disc drive 330 are connected to the system bus 316 by a hard disc drive interface 332 and an optical disc drive interface 336, respectively. The drives and external memory devices and their associated computer-readable media provide nonvolatile storage media for the computing device 310 on which computer-executable instructions and computer-readable data structures may be stored. Other types of media that are readable by a computer may also be used in the exemplary operation environment.

A number of program modules may be stored in the drives and RAM 320, including an operating system 338, one or more application programs 340, other program modules 342 and program data 344. In particular, application programs 340 can include code used to interact with the brainwave sensors, perform analysis on brainwave sensor signals and display user interfaces based on the brainwave sensor signals. Program data 344 may include profile information including brainwave sensor signal histograms with tagging information such as time, date, instructor, subject matter, texts, instruction technique, videos and the like.

Input devices including a keyboard 363 and a mouse 365 are connected to system bus 316 through an input/output interface 346 that is coupled to system bus 316. Monitor 348 is connected to the system bus 316 through a video adapter 350 and provides graphical images to users. Other peripheral output devices (e.g., speakers or printers) could also be included but have not been illustrated. In accordance with some embodiments, monitor 348 comprises a touch screen that both displays input and provides locations on the screen where the user is contacting the screen.

The computing device 310 may operate in a network environment utilizing connections to one or more remote computers, such as a remote computer 352. The remote computer 352 may be a server, a router, a peer device, or other common network node. Remote computer 352 may include many or all of the features and elements described in relation to computing device 310, although only a memory storage device 354 has been illustrated in FIG. 3. The network connections depicted in FIG. 3 include a local area network (LAN) 356 and a wide area network (WAN) 358. Such network environments are commonplace in the art.

The computing device 310 is connected to the LAN 356 through a network interface 360. The computing device 310 is also connected to WAN 358 and includes a modem 362 for establishing communications over the WAN 358. The modem 362, which may be internal or external, is connected to the system bus 316 via the I/O interface 346.

In a networked environment, program modules depicted relative to the computing device 310, or portions thereof, may be stored in the remote memory storage device 354. For example, application programs may be stored utilizing memory storage device 354. In addition, data associated with an application program may illustratively be stored within memory storage device 354. It will be appreciated that the network connections shown in FIG. 3 are exemplary and other means for establishing a communications link between the computers, such as a wireless interface communications link, may be used.

Figure 4:
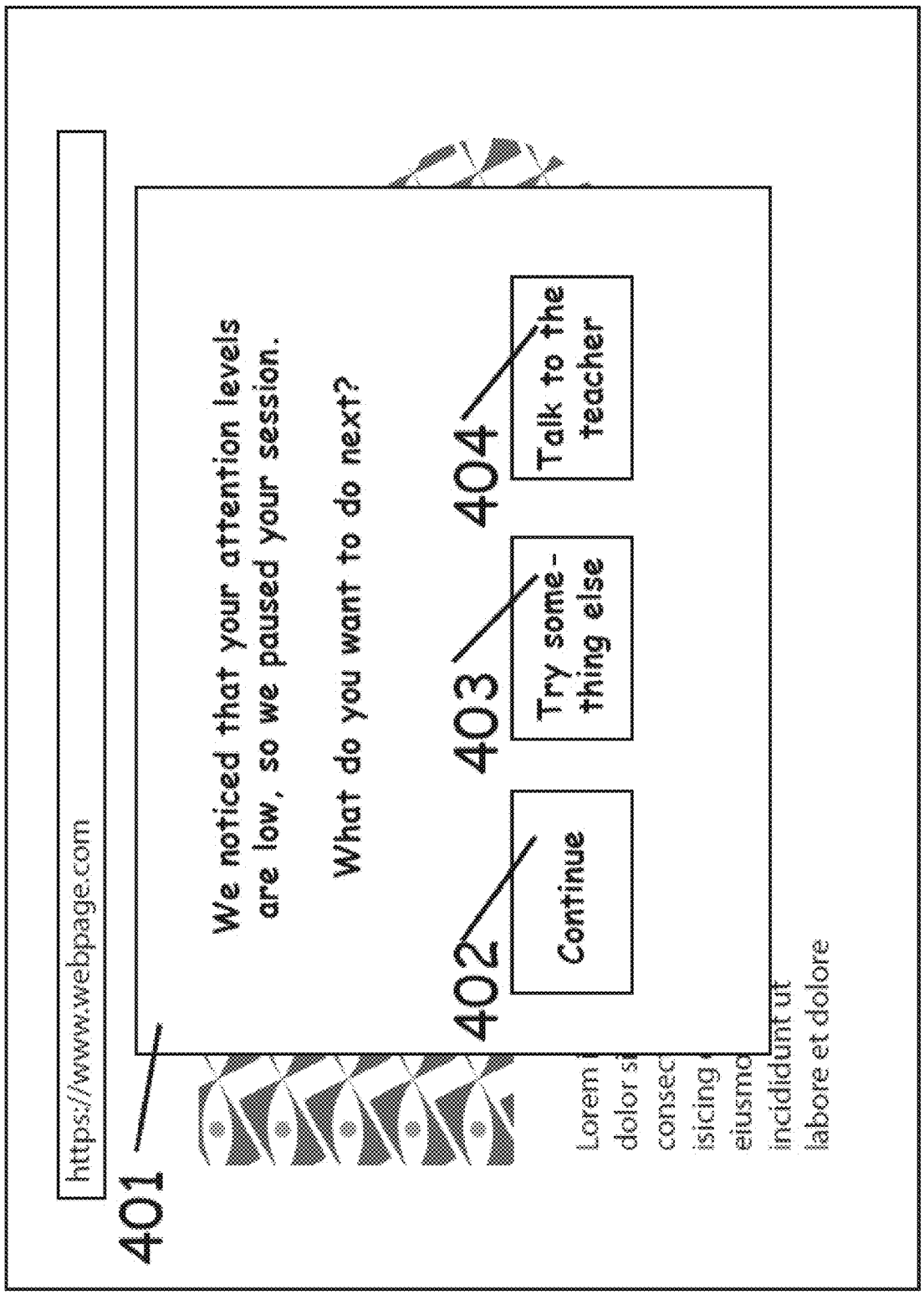
FIG. 4 is a screen mockup of the adaptation of an individual student experience based on low attention levels featuring options to stop, continue, or communicate with a teacher.
Figure 5:
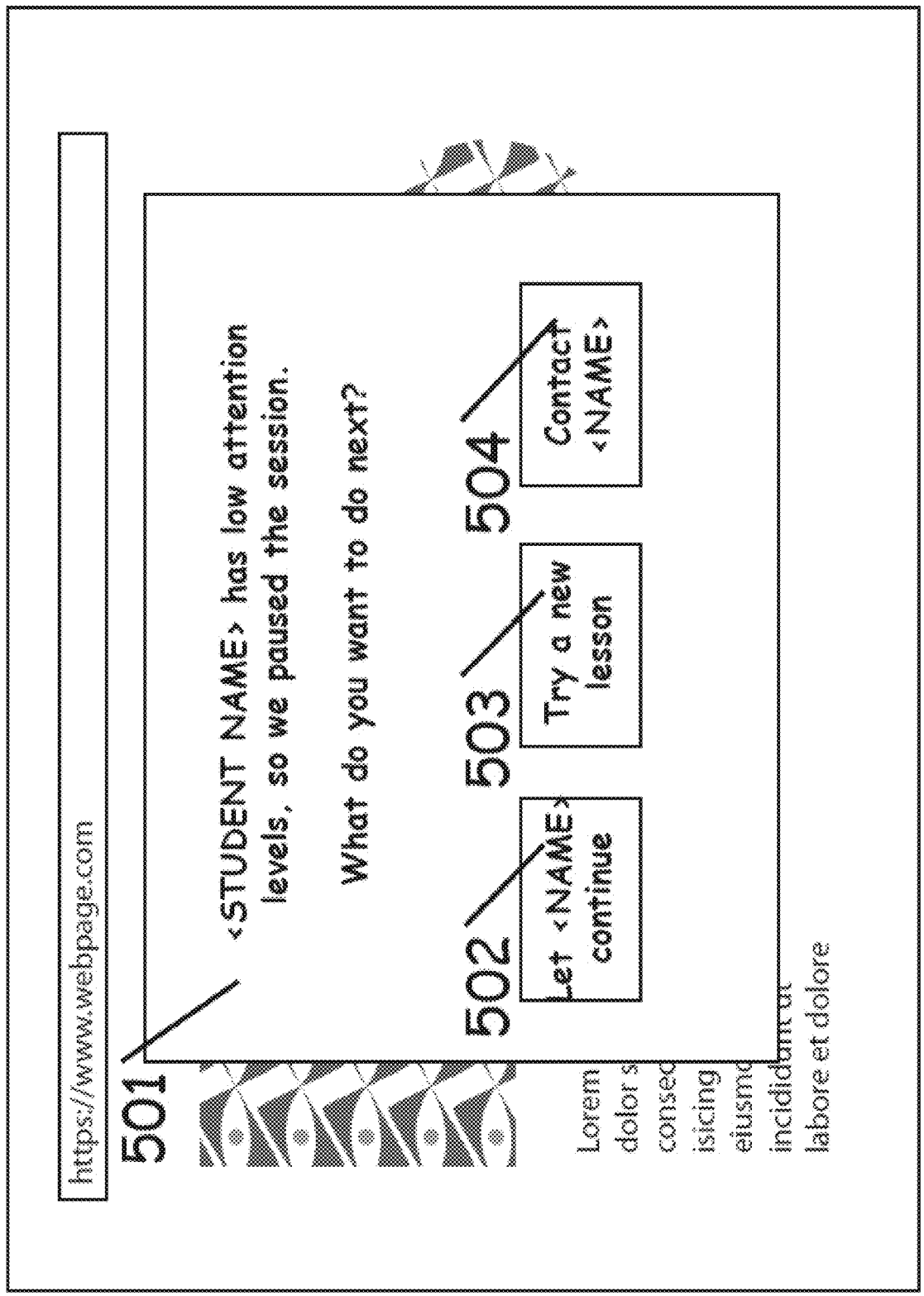
FIG. 5 is a screen mockup of the adaptation of teacher experience based on low attention levels of an individual student.

FIG. 4 is a mock up of a computer screen that an individual student would see when attention levels are very low. The invention takes frequent and routine measurements of a student's attention levels, rendering attention scores on a scale of 1 (low attention levels) to 5 (high attention levels). When two or more consecutive attention measurements of a student are at Level 1, the software system stops the student's experience and produces a new window 401. Students must choose 402 to stop the learning session voluntarily, 403 to contact the teacher, or 404 to ask the teacher to continue the learning session. A student's ability to continue requires a teacher's permission, thus giving the teacher an opportunity to coach the student before taking action. Note that FIG. 4 and FIG. 5 are inked in terms of their presentation to users of the software system. Low student attention levels trigger the presentation of FIG. 4 to students and FIG. 5 to teachers. This simultaneous presentation to each user is meant to give the student and teacher options for continuing the session or communicating in order to discuss or resolve the low attention levels.

FIG. 5 is a mockup of a computer screen that a teacher sees when an individual student has low attention scores. The circumstances (two consecutive low-level attention measurements) that deliver the FIG. 4 to a poorly attending student also deliver FIG. 5 to that student's teacher. The teacher receives a notification 501 of a student's poor attention level and has three options: 502 to allow the student to continue the learning session, 503 to contact the student in order to learn why attention levels are low, or 504 to stop the student's learning session (and possibly direct the student to a new learning session).

Figure 6:
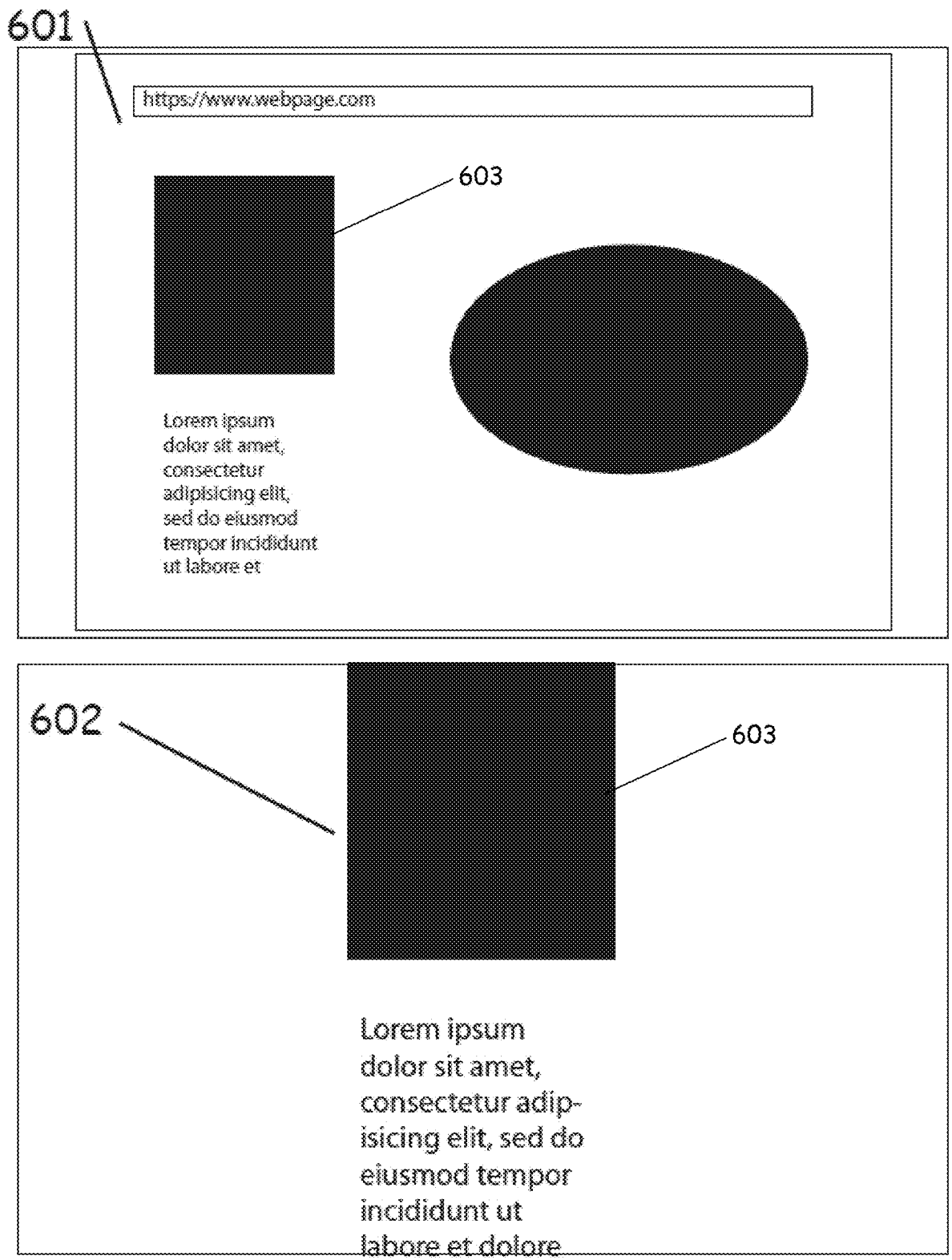
FIG. 6 is a screen mockup of the adaptation of an individual student experience based on low attention levels featuring a forced magnification of a web page.

FIG. 6 is a screen mockup of the adaptation of an individual student experience based on low attention levels. The student is viewing a web page 601 in a normal viewing mode, but low attention scores prompt a forced magnification 602 of a specific element 603 of web page 601. If the student clicks on any part of the screen, the student's view will return to the normal view.

Figure 7:
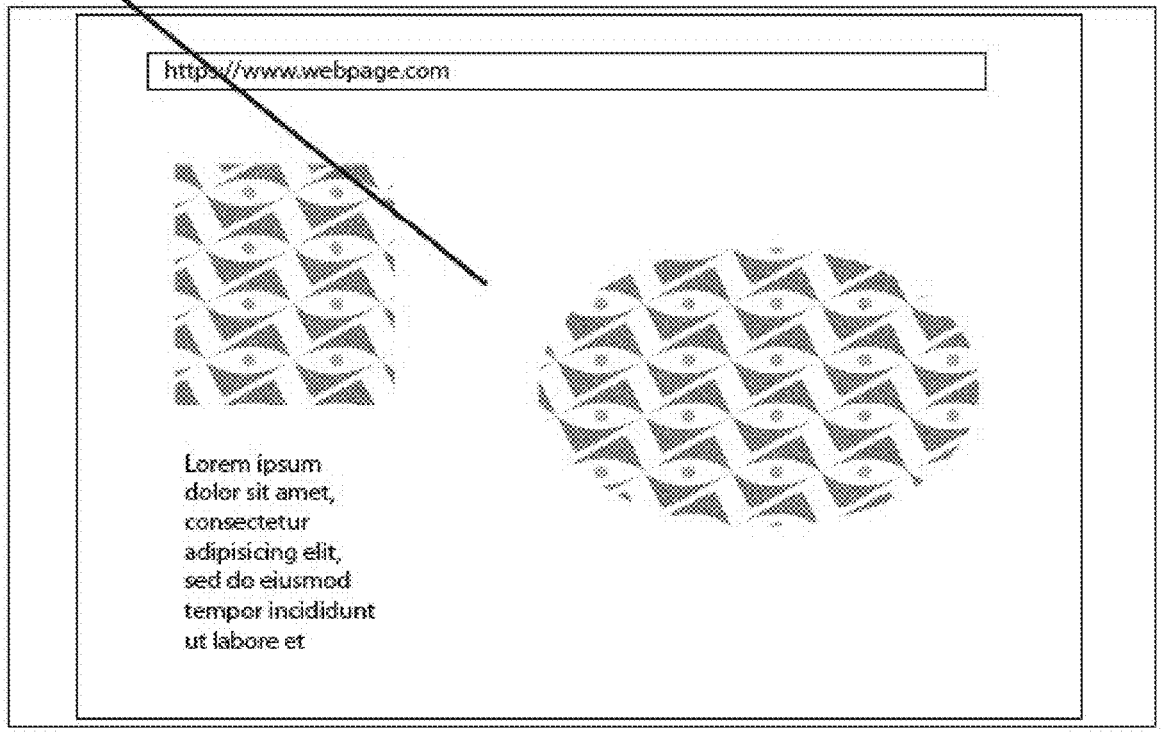
FIG. 7 is a screen mockup of the adaptation of an individual student experience based on low attention levels featuring a forced change of contrast and brightness levels on the screen.
Figure 7:
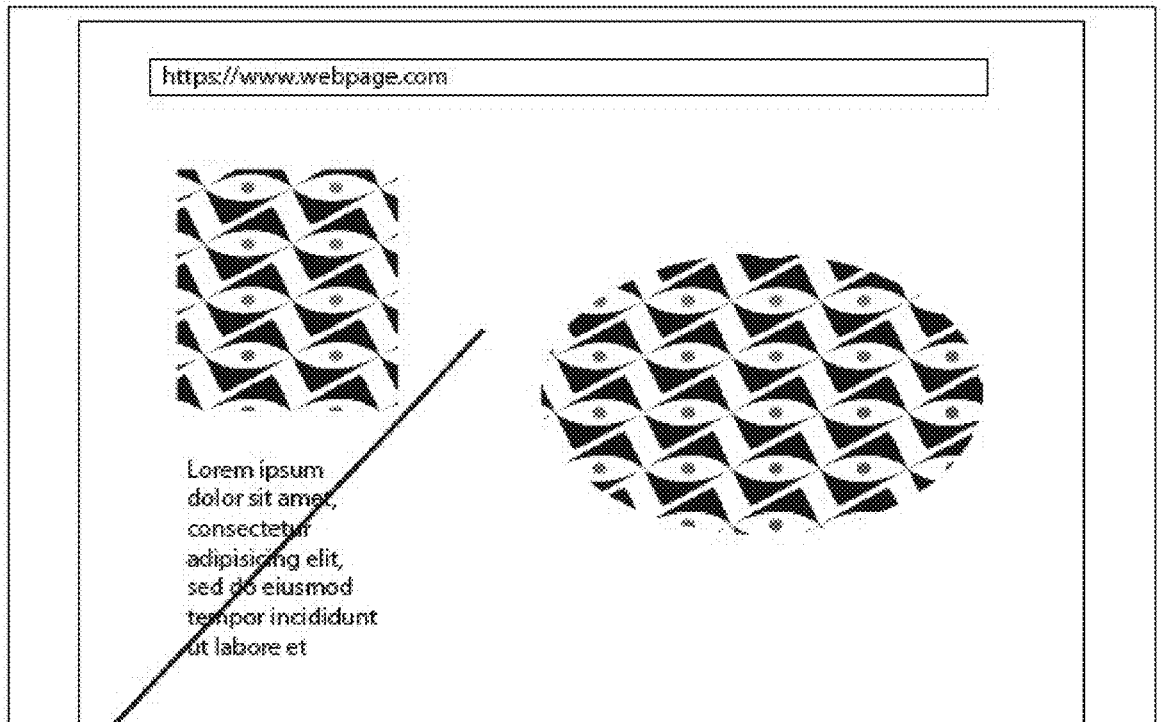

FIG. 7 is a screen mockup of the adaptation of an individual student experience based on low attention levels. The student is viewing a web page 701 in a normal viewing mode, but low attention levels prompt a forced change to the brightness and contrast settings producing an altered view 702. If the student clicks on any part of the screen, the student's view will return to the normal view 701.

Figure 8:
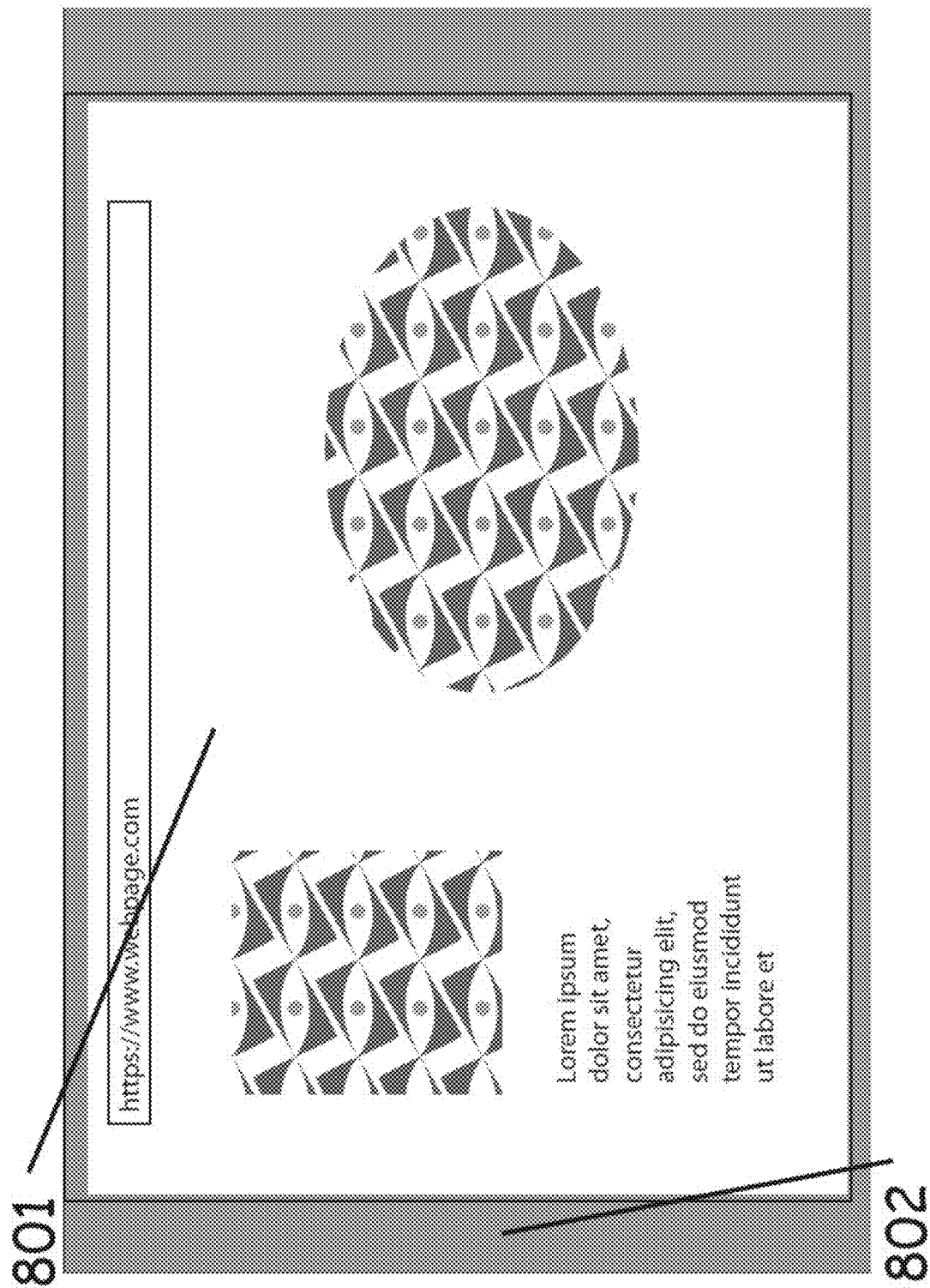
FIG. 8 is a screen mockup of the adaptation of an individual student experience based on high attention levels featuring a colored border on the perimeter of the screen.

FIG. 8 is a screen mockup of the adaptation of an individual student experience based on high attention levels. A student is viewing a web page 801. The student is paying attention at a high level, prompting the appearance of a colored border 802 to indicate the high attention level to the student as a means of reinforcement. Note that the colored border 802 can be shaded blue or green in correspondence with very high and moderately high attention levels, respectively. This colored border will automatically disappear after five seconds.

Figure 9:
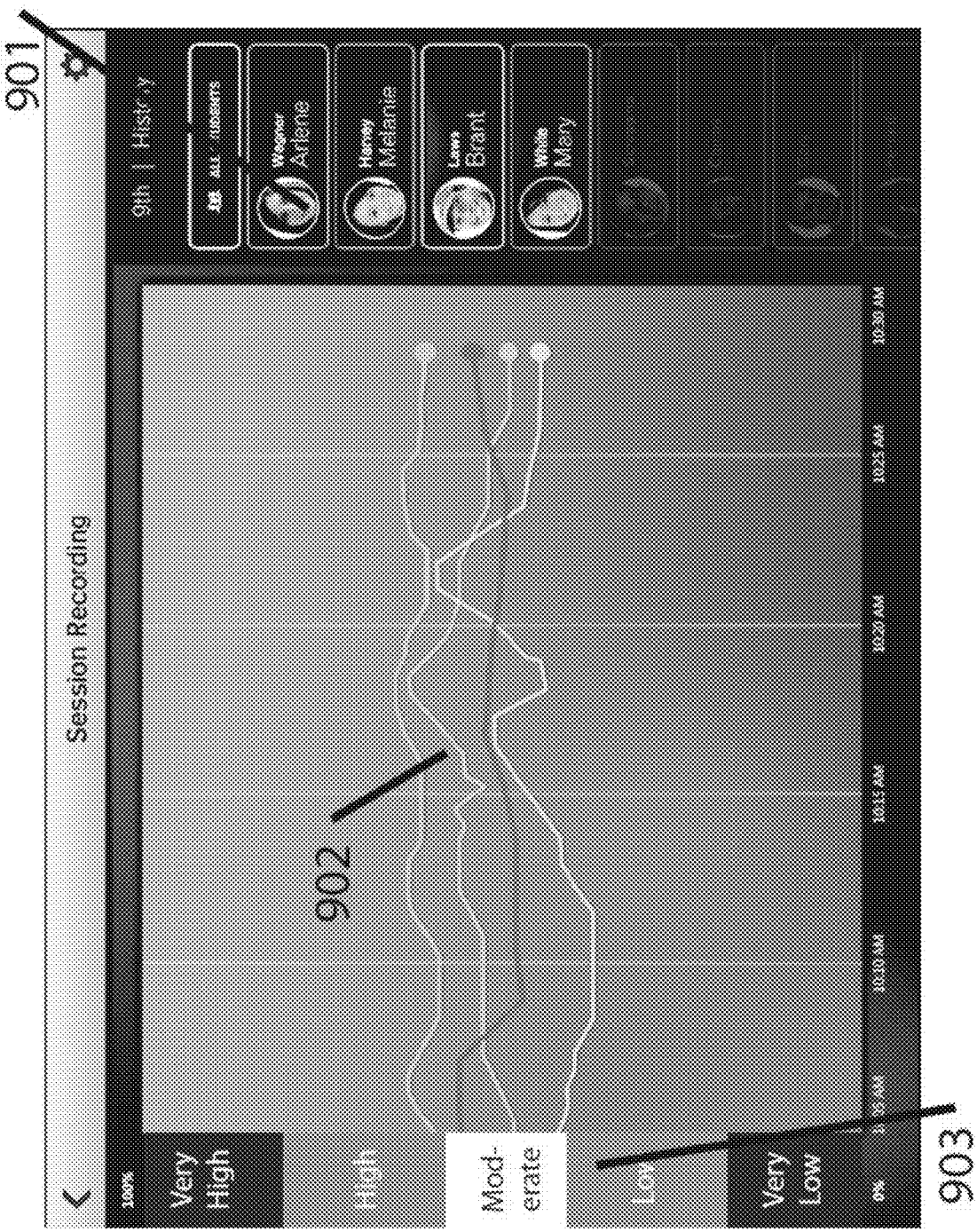
FIG. 9 is a screen mockup of a teacher's view of multiple students featuring the five-band display of attention levels.

FIG. 9 is a screen mockup of a teacher's view of multiple students. The teacher can view the attention levels of students 901 as identified on the right side of the screen. The teacher also can view the recent performance of each student with the plots 902 that display recent attention level readings for each of students 901. The teacher also has a view of the five-band attention level framework 903, allowing the teacher to see whether each student's attention levels have been adequate, better than adequate, or worse than adequate for instruction. If the teacher clicks on any of the student avatars 901, more detailed reports on that individual student will appear. If the teacher clicks on any of the dots on the plots 902, the teacher will see more information on the attention measurement, including an identification of what the student was viewing at the time of the attention level measurement. If the teacher clicks on any of the attention level bands 903, the teacher will see additional details on the definition of the selected attention level band.

Figure 10:
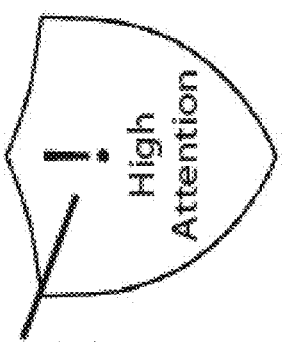
FIG. 10 is a screen mockup of an individual student experience based on high attention levels featuring the award of a badge.

FIG. 10 is a screen mockup of an individual student experience based on high attention levels. The student is viewing a normal web page 1001 when high attention levels prompt the appearance of an award 1002 of a badge. This badge will be assigned to the student's profile, and it can be exported to other software systems that keep track of digital badges as a means of awarding and ranking students. If the student clicks on the Continue button 1003, the student will return to the web page.

Figure 11:
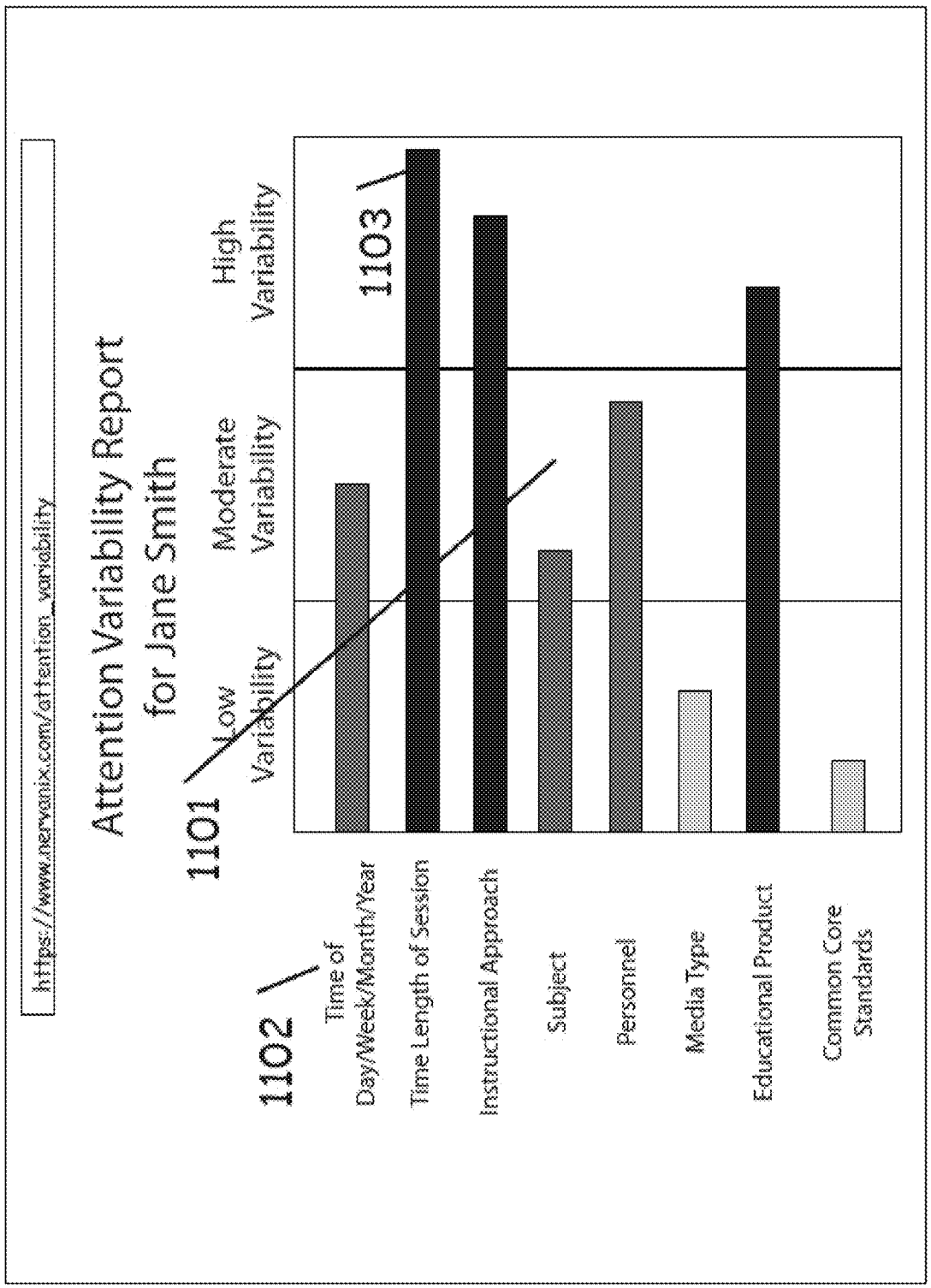
FIG. 11 is a screen mockup of an attention variability report.

FIG. 11 is a screen mockup of an attention variability report. This report features a display of levels of attention variability 1101 that are separated into three levels: low variability meaning that student attention levels do not change significantly when a specific attribute 1102 of instruction changes, moderate levels meaning that attention levels change significantly, and high levels indicating a very significant change in attention levels. The measurements of variability for each attribute 1102 are indicated as bars 1103 that associate variability levels 1101 with attributes 1102. The purpose is to identify the most impactful ways to change instructional circumstances in relation to an individual student's attention levels. If the teacher clicks on any of the attention level headers 1101, the teacher will see additional information to explain the concept of variability in attention levels. If the teacher clicks on an individual attribute 1102, the teacher will see additional information that explains the attribute. If the teacher clicks on any of the individual bars 1103, the teacher will see recommendations on how to help adjust the attribute 1102 in order to improve their attention levels.

Although elements have been shown or described as separate embodiments above, portions of each embodiment may be combined with all or part of other embodiments described above.

Although the present invention has been described with reference to preferred embodiments, workers skilled in the art will recognize that changes may be made in form and detail without departing from the spirit and scope of the invention.

The invention claimed is:

1. A system comprising:
   a brain activity sensor sensing electrical activity of a students' brain; and
   a device:
      receiving messages from the brain activity sensor while the student is receiving instructions with a first value for an attribute of instruction and determining a first attention level from the received messages;
      receiving additional messages from the brain activity sensor while the student is receiving instructions with a second value for the attribute of instruction and determining a second attention level from the additional received messages;
      determining an attention variability for the attribute of instruction based on a change in attention level from the first attention level to the second attention level;
      displaying the attention variability for the attribute of instruction on a display;
      receiving an indication that the attention variability for the attribute of instruction is selected; and
      in response to the selection of the displayed attention variability, providing a recommendation for an adjustment for the attribute of instruction to increase an attention level of the student.

2. The system of claim 1 wherein the attribute of instruction comprises a time of instruction.

3. The system of claim 1 wherein the attribute of instruction comprises a day of the week of instruction.

4. The system of claim 1 wherein the attribute of instruction comprises a time length for the instruction.

5. The system of claim 1 wherein the attribute of instruction comprises an instructional approach.

6. The system of claim 1 wherein the attribute of instruction comprises a media type.

7. A method comprising:
   receiving sensor data from a brain activity sensor that senses electrical activity of a student's brain during two different phases of instruction, each phase of instruction having a different value for an instruction attribute;
   using the sensor data to determine a variability of attention levels of the student in response to changes in the instruction attribute;
   displaying the variability of the attention levels of the student to changes in the instruction attribute
   receiving a selection of the displayed variability of the attention levels and in response providing a recommendation for an adjustment of the instruction attribute to increase the attention level.

8. The method of claim 7 wherein displaying the variability of the attention levels of the student to changes in the instruction attribute comprises displaying the variability of the attention levels with a plurality of variabilities of attention levels determined for a plurality of respective other instruction attributes.

9. The method of claim 7 wherein the instruction attribute comprises an identity of an instructor.

10. The method of claim 7 wherein the instruction attribute comprises a time of instruction.

11. The method of claim 7 wherein the instruction attribute comprises a time length of an instruction session.

12. The method of claim 7 wherein the instruction attribute comprises a media type.

13. The method of claim 7 wherein the instruction attribute comprises an instructional approach.

14. A system comprising:
   a brain activity sensor sensing electrical activity of a student's brain;
   a device receiving messages from the brain activity sensors, using the received messages to determine a variability of the student's attention level based on changes in an instructional attribute, and generating a user interface displaying the variability in the student's attention level based on changes in the instructional attribute such that upon selection of the displayed variability, the device generates a recommendation for adjusting the instructional attribute to increase the student's attention level.

15. The system of claim 14 wherein generating the user interface comprises displaying a separate variability in the student's attention level for each of a plurality of respective instructional attributes.

16. The system of claim 14 wherein the instructional attribute comprises an instructional approach.

17. The system of claim 14 wherein the instructional attribute comprises a media type.

18. The system of claim 14 wherein the instructional attribute comprises a length of time of instruction.

19. The system of claim 1 wherein providing the recommendation comprises adapting experiences in a software system.

20. The system of claim 7 wherein providing the recommendation comprises adapting experiences in a software system.

21. The system of claim 14 wherein generating the recommendation comprises adapting experiences in a software system.

* * * * *